(12) United States Patent
Beattie (10) Patent No.: US 10,890,251 B2
(45) Date of Patent: Jan. 12, 2021

(54) TRANSMISSION SHIFTER ASSEMBLY WITH REMOVABLE FEEDBACK

(71) Applicant: Dura Operating, LLC, Auburn Hills, MI (US)

(72) Inventor: Dale A. Beattie, Norton Shores, MI (US)

(*) Notice: Subject to any disclaimer, the term of this patent is extended or adjusted under 35 U.S.C. 154(b) by 113 days.

(21) Appl. No.: 15/856,314

(22) Filed: Dec. 28, 2017

(65) Prior Publication Data

US 2019/0203831 A1    Jul. 4, 2019

(51) Int. Cl.
   *F16H 61/24*    (2006.01)
   *F16H 59/08*    (2006.01)

(52) U.S. Cl.
   CPC ............ *F16H 61/24* (2013.01); *F16H 59/08* (2013.01); *F16H 2059/081* (2013.01); *F16H 2061/241* (2013.01); *F16H 2061/243* (2013.01); *F16H 2061/247* (2013.01)

(58) Field of Classification Search
   CPC ....... F16H 2059/081; F16H 2059/0295; F16H 61/24; F16H 2061/243
   USPC .......................................................... 74/473.3
   See application file for complete search history.

(56) References Cited

U.S. PATENT DOCUMENTS

| 9,212,740 | B2 | 12/2015 | Watanabe et al. |
| 9,334,949 | B2 | 5/2016 | Fett et al. |
| 9,620,309 | B2 | 4/2017 | Hoskins et al. |
| 2007/0261509 | A1 | 11/2007 | Meyer et al. |
| 2013/0313086 | A1 | 11/2013 | Redwood et al. |
| 2015/0285351 | A1 | 10/2015 | Rake et al. |
| 2016/0138704 | A1 | 5/2016 | Watanabe et al. |
| 2016/0312882 | A1 | 10/2016 | Heo et al. |
| 2017/0074391 | A1 | 3/2017 | Tebbe |

FOREIGN PATENT DOCUMENTS

| SU | 258797 A1 | 12/1969 | |
| WO | WO2013123375 A3 | 8/2013 | |
| WO | WO2015088630 A1 | 6/2015 | |
| WO | WO-2018217865 A1 * | 11/2018 | ......... F16H 63/3491 |

* cited by examiner

*Primary Examiner* — Randell J Krug
(74) *Attorney, Agent, or Firm* — Vivacqua Crane (57) ABSTRACT

At least some implementations of a transmission gear shifter include a first shift member, a second shift member, an actuator, multiple feedback surfaces and a follower. The actuator drives the second shift member between a first position and second position and thereby rotates the first shift member from one of the multiple positions to another of the multiple positions. The feedback surfaces are associated with the first shift member, and the follower is movable relative to the feedback surfaces between a first position and a second position. When the follower is in the first position, the follower is not engageable with the feedback surfaces, and when the follower is in the second position, the follower is engageable with the feedback surfaces and when the follower is in the second position there is relative sliding motion between the follower and the feedback surfaces when the first shift member is rotated.

11 Claims, 7 Drawing Sheets

TRANSMISSION SHIFTER ASSEMBLY WITH REMOVABLE FEEDBACK

TECHNICAL FIELD

The present disclosure relates generally to a gear shift system for a vehicle transmission.

BACKGROUND

In some vehicles, a gear shift lever in a passenger compartment of the vehicle can be moved by an operator of the vehicle to shift the vehicle transmission between its park gear and other gears, such as reverse, neutral and forward drive gears. The shift lever is mechanically coupled to the transmission through a cable that transmits the shift lever movement to a transmission shift mechanism. Other vehicles use a so-called "shift-by-wire" system wherein an operator shift lever or shift control unit is not physically coupled to the transmission shift mechanism by a cable. Instead, the shift control unit is electrically coupled to a shift actuator that is arranged to shift the transmission upon receipt of a signal from the shift control unit that a transmission gear shift is desired by the operator. It may be desirable, in at least some circumstances, to selectively prevent movement of the shift lever to prevent shifting the transmission at least until certain conditions are satisfied. For example, to shift the transmission out of park, a vehicle brake may need to be depressed or some other driver action may be needed. In some instances, it may be desirable to shift the transmission without a user command to do so.

SUMMARY

At least some implementations of a transmission gear shifter include a first shift member, a second shift member, an actuator, multiple feedback surfaces and a follower. The first shift member has a body rotatable among multiple positions, and the second shift member is coupled to the first shift member and movable between a first position and a second position. The actuator is coupled to the second shift member to drive the second shift member between the first position and second position and thereby rotate the first shift member from one of the multiple positions to another of the multiple positions. The multiple feedback surfaces are associated with the first shift member, and the follower is movable relative to the feedback surfaces between a first position and a second position. When the follower is in the first position, the follower is not engageable with the feedback surfaces, and when the follower is in the second position, the follower is engageable with the feedback surfaces and when the follower is in the second position there is relative sliding motion between the follower and the feedback surfaces when the first shift member is rotated.

In at least some implementations, the first shift member rotates about an axis and the feedback surfaces include multiple valleys and multiple peaks, with a respective one of the peaks located between two adjacent valleys, and the peaks are located at a different distance from the axis than are the valleys, and the follower is yieldably biased for movement closer to and further away from the axis so that the follower may remain engaged with the feedback surfaces when aligned with the peaks and when aligned with the valleys. The follower may be driven between the first position and second position by the actuator.

In at least some implementations, the shifter also includes a retainer movable relative to the body. The retainer may be coupled to the actuator and driven by the actuator between a first position in which the retainer prevents movement of the body and a second position in which the retainer permits movement of the body. The follower may be carried by the retainer for movement with the retainer, and when the retainer is in the second position the follower is in the second position. The retainer may move along a linear path between the first position of the retainer and the second position of the retainer. In at least some implementations, the retainer and body include control features that are radially overlapped relative to the axis when the retainer is in the first position are not radially overlapped when the retainer is in the second position. The retainer may include a cam surface at least a portion of which is located between the pivot and second end, and the cam surface may be inclined relative to the path of movement of the retainer so that engagement of the retainer with the cam surface of the second shift member causes increased rotation of the body.

In at least some implementations, the feedback surfaces are provided on the body and the peaks are radially farther from the axis than are the valleys. Each valley may correspond to a respective one of the multiple positions of the first shift member.

In at least some implementations, the second shift member has a first end, a second end and is coupled to a pivot between the first end and second end for rotation of the second shift member about the pivot. The second shift member may be coupled to the body between the pivot and first end and the retainer may be engageable with the second shift member between the pivot and second end. Rotation of the body causes the second shift member to rotate about the pivot and engagement of the retainer with the second shift member during at least a portion of the movement of the retainer from the second position of the retainer toward the first position of the retainer causes the second shift member to rotate about the pivot and rotate the body. The distance from the pivot to the first end may be greater than the distance from the pivot to the second end.

In at least some implementations, a shifter for a vehicle transmission includes a first shift member, a retainer, an actuator, a second shift member, feedback surfaces and a follower. The first shift member has a body rotatable about an axis between a park position, a reverse position, a neutral position and a drive position. The retainer is movable relative to the body between a first position in which part of the retainer interferes with rotation of the body, and a second position in which the retainer does not interfere with rotation of the body. The actuator is coupled to the retainer to drive the retainer between the first position and second position. The second shift member is coupled to the first shift member so that the second shift member is in a first position when the first shift member is in the park position and the second shift member is in a position different than the first position when the first shift member is not in the park position. The second shift member has a portion engageable by the retainer as the retainer moves from the second position to the first position so that when the retainer is in the first position the second shift member is in the first position and the first shift member is in the park position. The feedback surfaces associated with the first shift member, and the follower is movable relative to the feedback surfaces between a first position wherein the follower is not engaged with the feedback surfaces, and a second position wherein the follower is engaged with the feedback surfaces. When the follower is in its second position, there is relative sliding motion between the follower and the feedback surfaces when the first shift member is rotated.

BRIEF DESCRIPTION OF THE DRAWINGS

The following detailed description of some implementations of a shifter will be set forth with regard to the accompanying drawings, in which.

DETAILED DESCRIPTION

Figure 1:
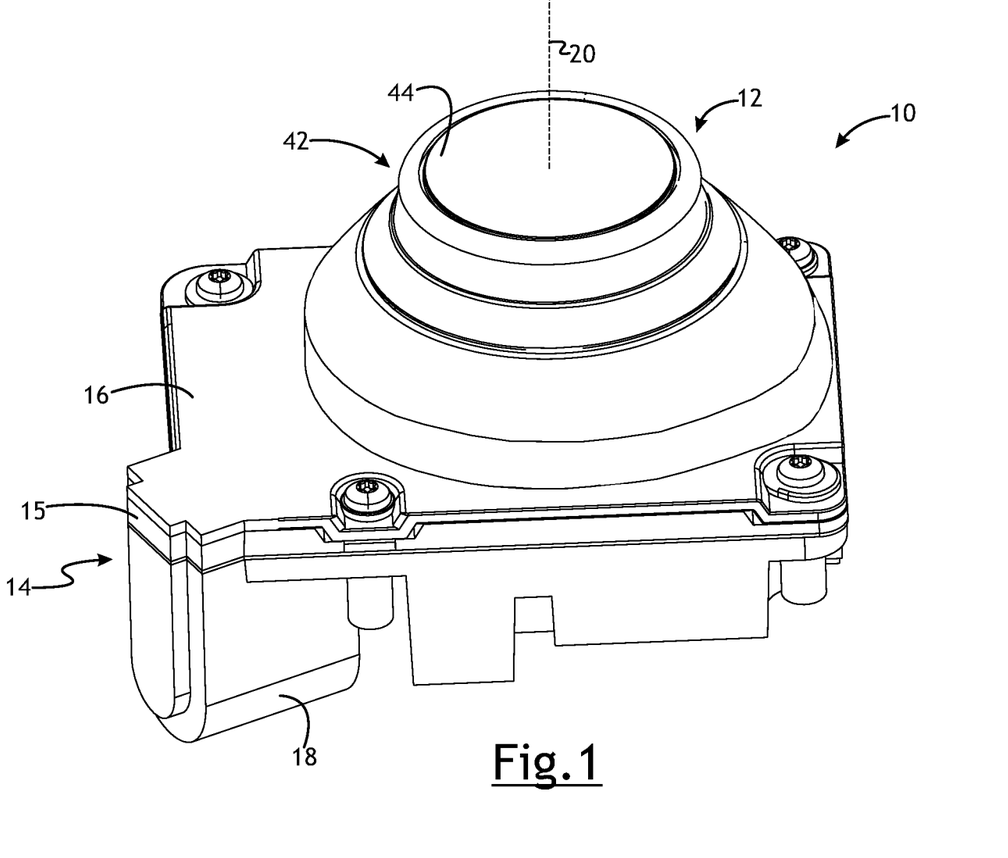
FIG. 1 is a top perspective view of a transmission gear shifter assembly with a rotary selector.
Figure 2:
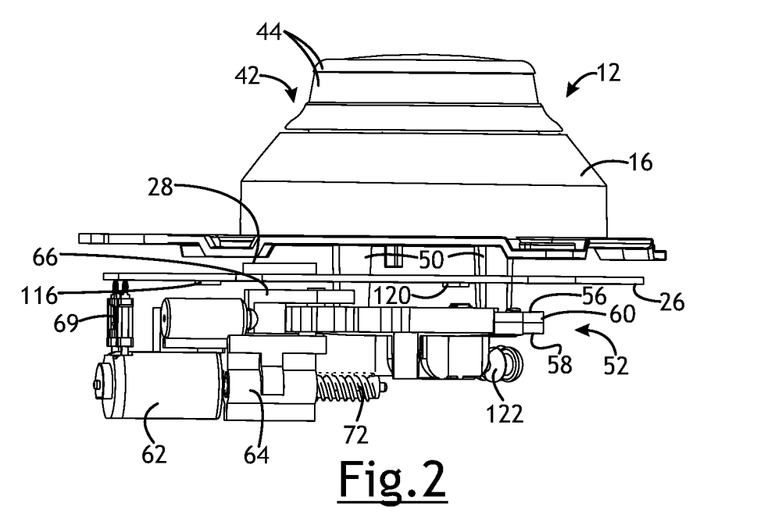
FIG. 2 is a side view of the shifter of FIG. 1 with a housing and some other components removed to show certain internal components including the selector, a circuit board, a second shift member, a retainer and an actuator.

Referring in more detail to the drawings, FIGS. 1 and 2 illustrate a rotary gear shifter 10 that may be used to shift among various gears of a transmission. In at least some implementations, the shifter 10 is not directly mechanically coupled to the transmission and instead communicates electrically with an actuator coupled to the transmission that, in turn, causes a change in the selected transmission gear in a so-called shift-by-wire system. The shifter 10 may include a first shift member, such as a dial, knob or other rotary selector 12, that may be manually rotated by a user through multiple positions corresponding to multiple gears of the vehicle transmission. By way of non-limiting examples, the selector 12 may include and be rotated to one or more positions that correspond to park, reverse, neutral and drive gears for a vehicle transmission.

The selector 12 may be mounted to a housing 14 (only part of which is shown to better illustrate internal components) that is arranged to be mounted within a vehicle. The housing 14 may have an upper portion 15, a cover 16 (FIGS. 1 and 2) over the upper portion and surrounding the selector 12 and a base 18 coupled to the upper portion 15 and/or cover to define an at least partial enclosure for the selector 12 and related shifter components, as set forth below. The selector 12 may be carried by the housing 14 for rotation relative to the housing about a central axis 20. And so that the selector may be manually actuated by a user to cause a transmission gear change, the selector 12 may extend at least partially out of the cover 16.

As shown in FIG. 2, within the enclosure, the shifter 10 may include a circuit board 26 on which one or more circuit elements, such as a microprocessor or controller 28, may be mounted. In at least some implementations, the circuit board 26 is generally planar and is mounted perpendicularly to the axis 20 of rotation of the selector 12. If desired, a gasket or other seals may be provided between the cover 16 and the circuit board 26. For example, a gasket may be provided between the flange 24 of the cover 16 and the circuit board 26. The gasket and/or other seals may help to isolate the circuit elements on the circuit board 26 from liquids and other contaminants, if desired.

The housing base 18, or at least a portion thereof, is shown in FIGS. 1, 3 and 6-12 among others. The base 18 may include a post 30 (FIGS. 6-10) about which part of the selector 12 is received and which may help guide the rotation of the selector 12, and other features to mount or interact with various components within the housing 14, as will be discussed below.

Figure 3:
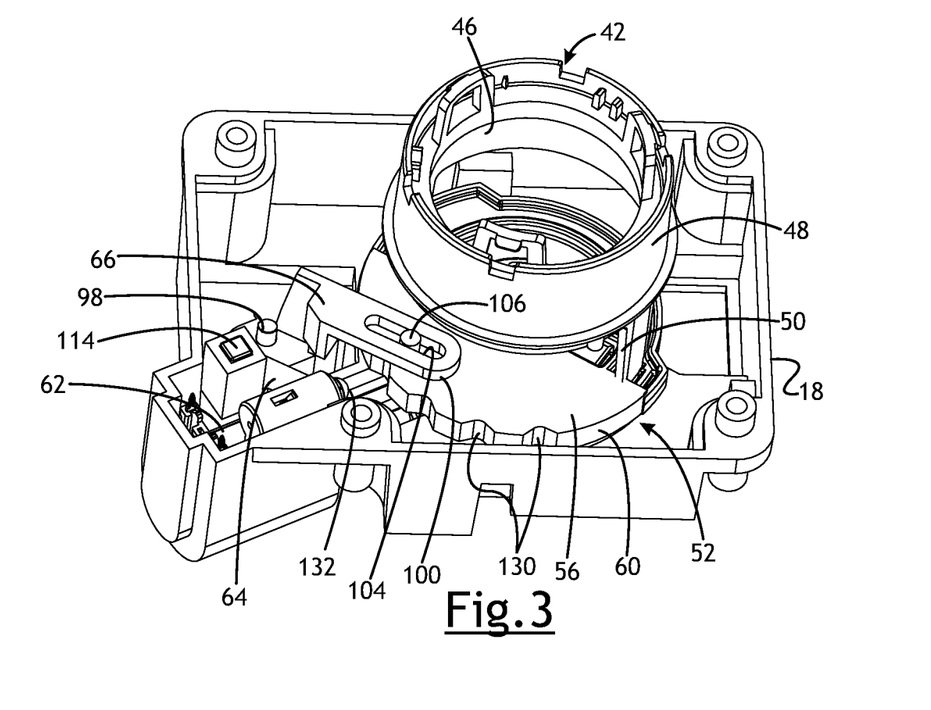
FIG. 3 is a top perspective view of the components shown in FIG. 2 with a cover of the selector and the circuit board removed.
Figure 4:
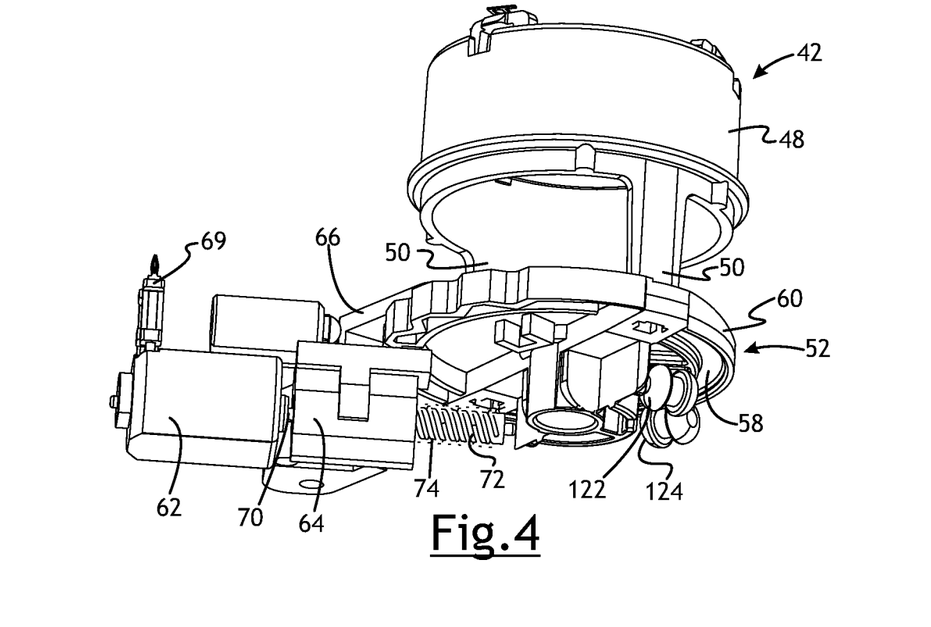
FIG. 4 is a bottom perspective view of the components shown in FIG. 3 with the housing base removed.
Figure 5A:
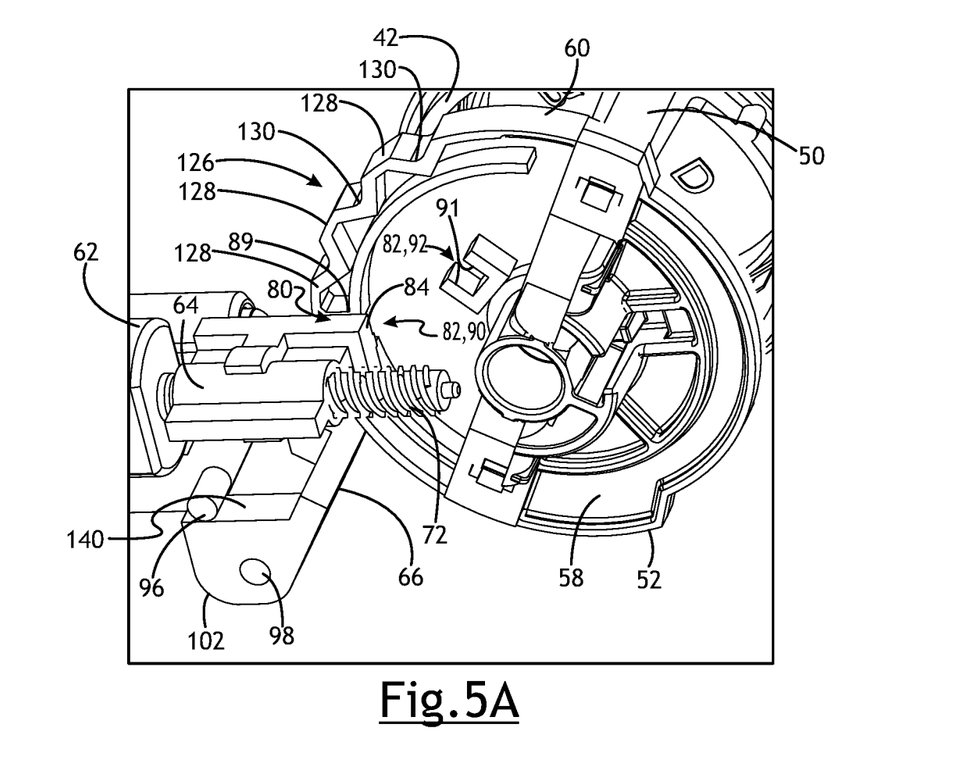
FIG. 5A is an enlarged, bottom perspective view of a portion of some of the components shown in FIG. 4 illustrating the selector in a first position corresponding to the transmission being in park, and the retainer in a first position preventing selector rotation.
Figure 5B:
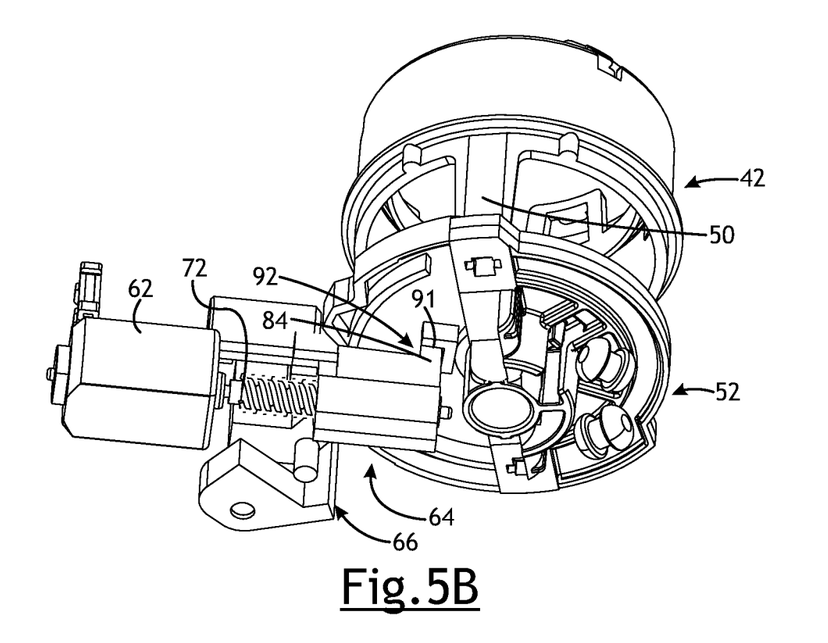
FIG. 5B is similar to FIG. 5A and illustrates the selector in a third position corresponding to the transmission being in neutral, and the retainer in a third position preventing selector rotation.

As shown in FIGS. 1-4, the selector 12 may include a user actuated first body 42 that may include or be coupled to a decorative cover 44 that is fixed to the first body for co-rotation with the first body. Referring to FIGS. 3-5, the first body 42 may include a cavity 46 or open space in which one or more buttons, lights, wires or other devices and things may be mounted on or adjacent to the column. The buttons may permit some shifting of the transmission (e.g. manual upshifts and downshifts in a sport mode), selection of infotainment system functions (e.g. radio, navigation and the like), and/or selection of other vehicle functions (e.g. heating and cooling settings). The light or lights may provide illumination of certain features of the selector 12, such as various indicia or features used to indicate the various positions of the selector.

The cavity 46 of the first body 42 may be defined at least in part by a cylindrical sidewall 48 which may be open at its ends, if desired. The first body 42 may also include one or more legs 50 (FIGS. 3-5) that extend axially from the sidewall 48 and are coupled to a second body 52, shown in FIGS. 2-12, for co-rotation of the first body 42 and second body 52. This provides some space between the first and second bodies 42, 52 in which components may be received. Of course, the legs 50 and provided space between the first and second bodies 42, 52 are not necessary and any such components can be provided within the cavity 46 or not at all, as desired.

The second body 52 may be fixed to the legs 50 or some other portion of the first body 42 for co-rotation with the first body. The second body 52 may be mounted to the housing 14, such as by the post 30 that extends into or through a central opening 54 (FIGS. 6-12) in the second body 52 so that the second body (and connected first body) rotate relative to the post and housing. In the example shown, the second body 52 is disc-shaped, with an upper face 56 facing the first body 42, a lower face 58 that faces in the opposite direction (e.g. toward the base 18 of the housing 14) and an axially and circumferentially extending sidewall 60 at the radial outer surface of the second body 52.

Further, the circuit board 26 may extend between the first and second bodies 42, 52 of the selector 12, with the legs 50 extending through holes in the circuit board, or located outboard (e.g. adjacent to side edges) of the circuit board. A portion of the upper housing 16 may also extend between the first and second bodies 42, 52 of the selector 12 to facilitate rotary mounting of the selector. In addition to or instead of these things, the electronic controller 28, which may include a microprocessor, could be received within the cavity 46. The controller 28 may be used to manage the operation of the shifter 10 including any buttons, lights or other features provided with the shifter, if desired. With portions of the selector 12 on either side of the circuit board 26, various electronic components may be located in close proximity to different portions of the selector to facilitate electrical coupling of the components to the circuit board 26 and controller 28.

An actuator 62 may be provided to drive one or both of a retainer 64 and a second shift member 66. As set forth in more detail below, the retainer 64 may selectively block rotation of the selector 12 and the second shift member 66 may be driven in certain circumstances to rotate the selector 12 and cause a transmission gear change without user actuation of the selector. In the example shown, the actuator 62 is carried by the housing base 18, which may include a cavity 68 in which a portion of the actuator is received. An electrical connector 69 may connect the actuator to the circuit board to provide power to the actuator, and to communicate the actuator with the controller 28.

In at least some implementations, the actuator 62 may be any desired form of rotary or linear actuator suitable to move the retainer 64 relative to the second body 52 as set forth below. In the example shown, the actuator is a reversible electric motor 62 with a rotary drive shaft 70 (FIG. 4). The drive shaft 70 is coupled to a drive member 72 that is coupled to and drives the retainer 64. In the example shown, the drive member is a cylindrical spindle 72 that has one or more outwardly extending threads 74 (FIG. 6) that mate with internal thread(s) of the retainer 64 to linearly drive the retainer relative to the actuator 62 and the second body 52. When the drive shaft 70 and spindle 72 are rotated in a first direction the retainer 64 is moved away from the motor 62, and when the drive shaft 70 and spindle 72 are rotated in a second direction the retainer 64 is moved toward the motor 62. The motor 62 may be controlled and actuated by the controller 28 on the circuit board 26 or by a different vehicle controller, as desired. While described with regard to linear motion, the retainer 64 could instead be rotated by the actuator, or moved along a path of some other shape, as desired.

Figures 10, 11:
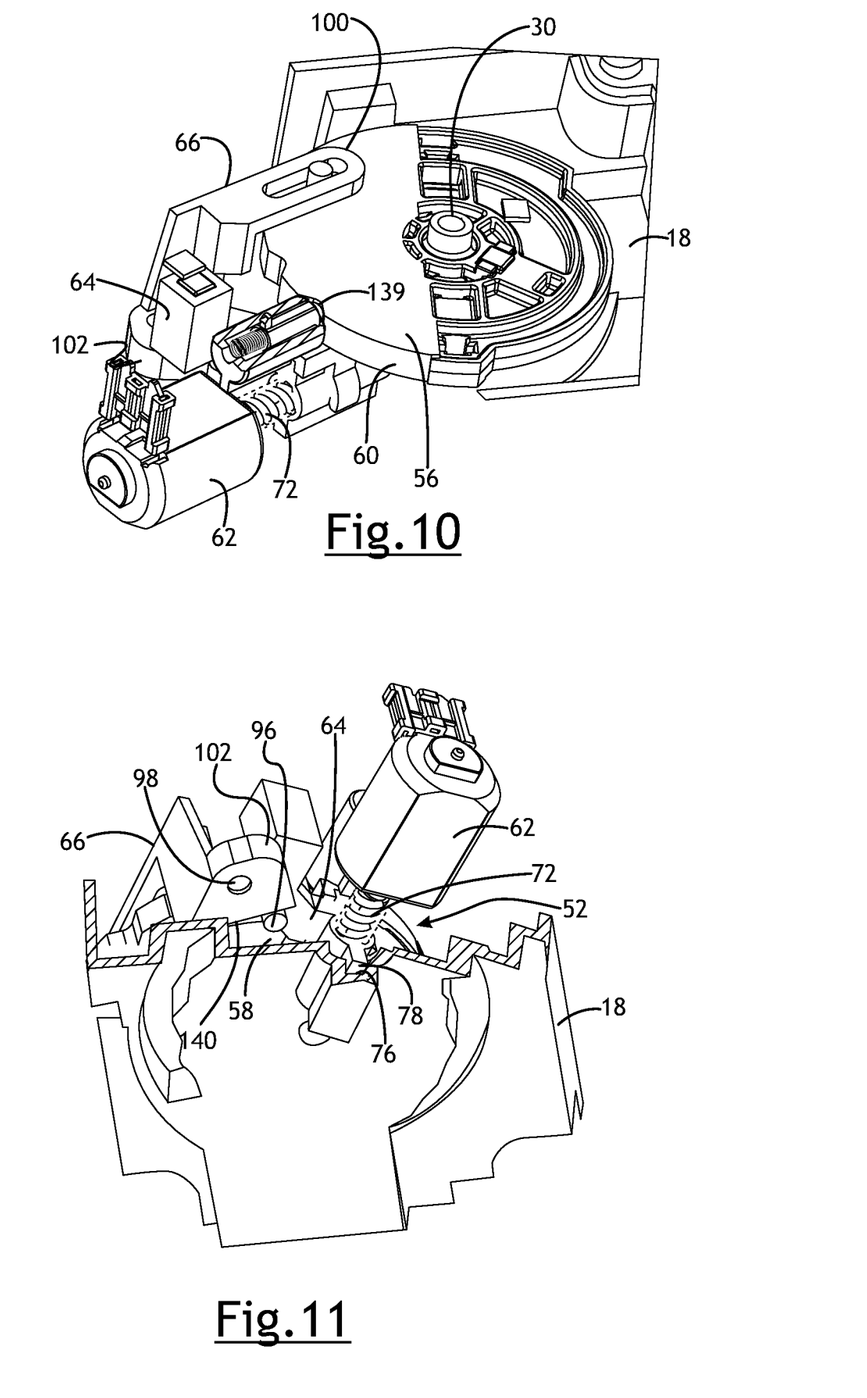
FIG. 10 is a perspective view showing the selector in a fourth position corresponding to the transmission being in neutral, and the retainer in the second position allowing selector rotation.
FIG. 11 is a bottom perspective view with the components in the positions of FIG. 10.
Figure 12:
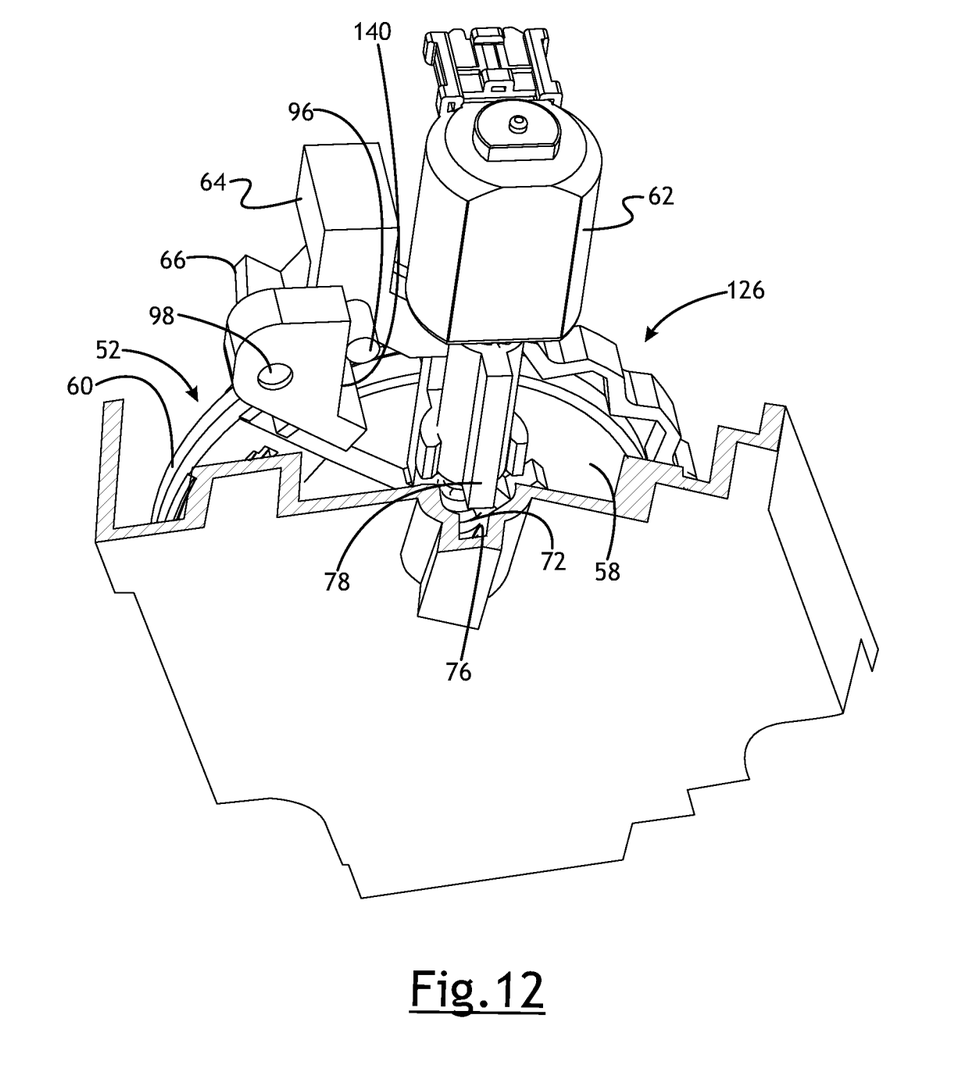
FIG. 12 is a view similar to FIG. 11 but showing the selector returned to its first position and the retainer returned to its first position.

As shown in FIGS. 11 and 12, in at least some implementations, the housing 14 may include or carry a guide member or surface 76 that extends at least part of the way between the actuator 62 and toward the second body 52. The retainer 64 may be slidably moved along a linear path defined by the guide surface 76 and relative to the second body 52. The guide surfaces 76 may be defined by one or more linear surfaces that integrally formed in and provided in the base 18, or by a component carried by the base. Accordingly, the rotary motion of the spindle 72 causes linear movement of the retainer 64, and rotation of the retainer is prevented by engagement of the retainer with the guide surface 76. In this regard, the retainer 64 may include one or more depending flanges 78 arranged parallel to the guide surface 76 (which could be a slot or channel in which a flange 78 slides) to guide movement of the retainer 64.

As shown in FIG. 5A, to control rotation of the second body 52 and hence, the selector 12, the retainer 64 may include one or more control features 80 that interact with control features 82 provided on the selector (e.g. the second body 52). The retainer control features 80 and selector control features 82 cooperate to inhibit or prevent rotation of the selector 12 in certain positions or the selector and/or in certain operating circumstances. For example, the retainer 64 may be positioned so that one or more of its control features 80 overlap one or more selector control surfaces 82 to prevent rotation of the second body 52 when the selector 12 is in the position corresponding to the transmission being in park. To shift the transmission out of park, a driver may have to take some action before rotating the selector 12, such as applying a vehicle brake. Upon detection that the vehicle brake has been applied, the actuator 62 may be energized to drive the retainer 64 to a position in which the retainer control features 80 are not overlapped with the selector control features 82 so that the second body 52 may be rotated relative to the retainer 64.

Similarly, in some instances, such as when a vehicle transmission has been in the neutral gear position for longer than a threshold time, it may be desirable to prevent shifting out of neutral without the driver taking some prerequisite action prior to rotating the selector 12. This is a so-called neutral lock. Such driver action may be applying the brake or pushing a button, for example. Upon detection that the transmission has been in neutral for longer than the threshold time, the actuator 62 may be commanded to move the retainer 64 to a position in which one or more of its control features 80 prevent rotation of the second body 52. And upon detection of the prerequisite driver action to shift out of neutral, the actuator 62 may drive the retainer 64 to a position that permits the second body 52 to be rotated relative to the retainer 64 so that the selector 12 may be rotated to shift the transmission.

In at least some implementations, the retainer control features 80 and selector control features 82 include opposing surfaces that, when aligned, are axially and radially overlapped so that rotation of the selector 12 is prevented. The control features 80, 82 may include some combination of blocking members and voids, wherein a blocking member may be received at least partially in a void or space defined by control features when it is desired to prevent rotation of the selector. In the example shown, the retainer includes the blocking members and the second body includes the voids, as is described further below. But other arrangements may be used including providing the second member with one or more blocking members and the retainer with one or more voids, or some combination of these.

In the example shown, the retainer 64 has a first control feature or first blocking member 84 that has oppositely facing surfaces that extend axially and radially (relative to the axis 20 of the second body 52). Other control features may also be provided to interact with different portions of the knob and/or its second body, as desired. The first blocking member 84 may be arranged radially within the periphery of the second body 52 in at least some positions of the retainer 64. The blocking member 84 may be provided in the same piece of material as the portion of the retainer 64 engaged with the spindle 72 and the retainer may thus be defined in a single, unitary body, if desired.

As shown in FIG. 5A, in more detail, the second body 52 has a first control feature that includes at least one stop surface 89 that defines at least part of a first void 90 arranged to receive the blocking member 84 of the retainer 64 so that the blocking member and stop surface are radially overlapped. Two stop surfaces 89 that define the first void 90 are shown as extending from the lower face 58 of the second body 52 and having a radial length and axial height. When the first tab 84 is radially aligned with and received at least partially in the first void 90, rotation of the second body 52 is prevented by engagement of the stop surfaces 89 with the retainer (e.g. its blocking member 84). In at least some implementations, the blocking member 84 is circumferentially aligned with the first void 90 when the selector is in the park position.

In at least some implementations, the second body 52 may include a second control feature that includes opposed stop surfaces 91 (FIG. 10) circumferentially spaced apart to define a second void 92 between them. Like the first void 90, the stop surfaces 91 of the second void 92 are shown as extending from the lower face 58 of the second body 52 and have a radial length and axial height. When the blocking member 84 is received in the second void 92, rotation of the second body 52 is prevented. In at least some implementations, the second void 92 is radially inwardly spaced and circumferentially offset from the first void 90, and is circumferentially aligned with the blocking member 84 when the selector is in a position other than park, for example, the neutral position.

Any desired number and arrangement of control features may be provided on the retainer 64 and second body 52 to provide desired control of the selector rotation. The control features could also be provided on the first body and the retainer 64 could interact with the first body as desired, or with another component that moves as the selector 12 is rotated.

The retainer 64 may further include a drive surface 96 (FIGS. 5, 11 and 12) arranged to engage, during at least a portion of the movement of the retainer, the second shift member 66 that is coupled to the selector 12. When the drive surface 96 of the retainer 64 engages and displaces the second shift member 66, the second shift member causes rotation of the selector 12 and a corresponding transmission gear shift. This may be desirable in a number of situations. For example, if a vehicle is turned off without first rotating the selector to shift the transmission to park, it may be desirable to automatically shift the vehicle into park via the second shift member 66. The second shift member 66 could also or instead rotate the selector 12 to shift the transmission to neutral or some other position, as desired.

With reference to FIGS. 6-12, in at least some implementations, the second shift member 66 is a rigid arm that is coupled to a pivot 98, shown in FIG. 3 as a peg integrally formed in the same body of material from which the housing base is formed, although other arrangements may be used. The second shift member 66 is coupled to the pivot 98 between first and second ends 100, 102 for rotation about the pivot 98, the axis of which may be parallel to the rotational axis 20 of the selector 12. The second shift member 66 is coupled to the second body 52 between the pivot 98 and first end 100 and the retainer 64 is engageable with the second shift member 66 between the pivot 98 and second end 102. Rotation of the second body 52 causes the second shift member 66 to rotate about the pivot 98, and engagement of the retainer 64 with the second shift member 66 during movement of the retainer 64 causes the second shift member 66 to rotate about the pivot 98 which rotates the second body 52, and hence, the entire selector 12.

In the implementations shown, the second shift member 66 includes a slot 104 that extends between the pivot 98 and first end 100, and the second body 52 includes a drive member, shown as a post 106 received within the slot 104. During rotation of the second body 52, the post 106 moves relative to the second shift member 66 within the slot 64. The distance from the pivot 98 to an end 108 of the slot 104 closest to the first end 100 of the second shift member may be greater than the distance from the second end 102 to the pivot 98 to provide a mechanical advantage so that comparatively less movement of the retainer 64 (when engaged with the second shift member 66) causes more rotation of the second body 52. Further, the post 106 may be located toward the radial periphery of the second body 52 to improve the leverage and force for rotation of the selector 12 by the second shift member 66. In at least some implementations, the actuator 62, through the retainer 64 and second shift member 66, may move the selector 12 from any position back to the position corresponding to park. In other words, the second shift member 66 and retainer 64 are arranged to move the selector 12 through its full rotary range of motion. The post 106 may be somewhat closely received within the slot 104 to reduce or eliminate lost motion between the post 106 and second shift member 66. That is, when the post 106 moves (due to rotation of the second body 52) the second shift member 66 moves, and vice versa. Further, the post 106 and second shift member 66 may move from one side of an imaginary line 112 (FIG. 8) or plane extending between the pivot 98 and axis 20 to the other side during the range of rotation of the selector 12. The post 106 is closest to the pivot 98 when aligned with the line 112 between the pivot 98 and axis 20.

Figure 6:
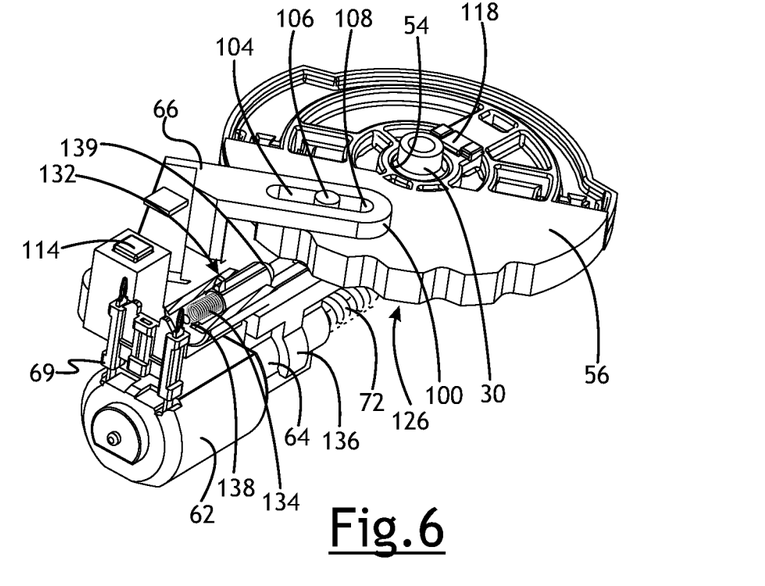
FIG. 6 is a perspective view similar to FIG. 3 with a portion of the selector removed and a portion of the housing base cut away, and showing the shifter and retainer in their first positions.

The shifter 10 may include one or more position sensors to provide a positive indication of the position of one or more components, such as the retainer 64 and the selector 12. As shown in FIG. 6 (among others), a first sensor element may be coupled to the retainer 64 and is shown as including a magnet 114 received within a cavity of the retainer 64. A first sensor 116 (FIG. 2) may be carried by the circuit board 26, for example, and may be a hall-effect or other type of sensor responsive to movement of the magnet 114 as the retainer 64 moves. Of course, sensor types other than magnetic may be used, as desired, including but not limited to optical and contact based resistive sensors (e.g. potentiometers). A second sensor element may be carried by the selector 12 for rotation about the axis 20 when the selector rotates, to facilitate a determination of the rotary position of the selector. In the example shown, the second sensor element includes a magnet 118 (FIG. 6) that is fixed to the second body 52. A second sensor 120 (FIG. 2) may be carried by the circuit board 26, for example, and may be a hall-effect or other type of sensor responsive to movement of the second magnet as the second body rotates. Of course, sensor types other than magnetic field sensors may be used, as desired, including but not limited to optical and contact based resistive sensors (e.g. potentiometers). The first and second sensors 116, 120 may be coupled to the controller 28 so that the positions of the retainer 64 and second body/selector 12 can be determined during operation of the shifter 10.

In at least some implementations, the shifter 10 may include one or more feedback surfaces 126 arranged to provide a variable resistance to selector rotation. In FIGS. 2-12, the feedback surfaces 126 are defined in the second body 52, more specifically, in the outer surface of the sidewall 60 of the second body 52. The feedback surfaces 126 have circumferentially spaced apart peaks 128 and valleys 130 (labeled in FIG. 5A but shown in many figures) at different radial distances from the axis 20. At least when the feedback surfaces 126 are on the second body 52, the peaks 128 may be at a greater distance from the axis 20 than are the valleys 130.

One or more than one follower 132 is arranged to slide along the feedback surfaces 126 during at least some rotation of the selector 12 to provide force feedback to a person rotating the selector. The follower 132 may be yieldably biased, such as by a spring 134, into engagement with the second body sidewall 60, or the follower 132 may be flexible and resilient, to permit the follower 132 to remain engaged with the sidewall as the feedback surfaces 126 are rotated past the follower 132. In at least some examples with a spring 134, the spring is compressed more when the follower 132 is aligned with a peak than when the follower 132 is aligned with a valley, and a greater force is needed to rotate the selector when the follower 132 moves over a peak than when the follower 132 moves into a valley. A resilient follower is itself compressed when aligned with a peak and may resiliently return to or toward an uncompressed state when aligned with a valley. The variation in force needed to rotate the selector 12 that is created by these force feedback surfaces 126 assists the user in finding a desired position, and also in retaining the selector 12 in a selected position as an increased force is needed to remove the follower 132 from a valley 130 (doing so requires more compression of the spring 134 or compression of the follower 132).

In at least some implementations, the valleys 130 may each correspond to a respective one of the various positions of the selector (that is, a first valley corresponds to the park position, a second valley corresponds to the reverse position, a third valley corresponds to the neutral position and a fourth valley corresponds to the drive position). An increased force may be needed to pass the follower 132 over a peak 128 between adjacent valleys 130, and then a spring or other return force acting on or provided by the follower 132 may tend to assist selector rotation toward a valley as the follower 132 rides along an inclined portion of a feedback surface 32 between a peak 128 and valley 130.

In at least some implementations, the follower 132 is carried by the retainer 64 for movement with the retainer relative to the second body 52. The follower 132 may also be yieldably biased by the spring 134 so that the follower 132 can move relative to the retainer as the follower 132 is moved over the peaks 128 and valleys 130. In the example shown, the follower 132 is carried by a holder 136 that is mounted to the retainer 64 for movement with the retainer. The holder 136 includes a cavity 138 in which the spring 134 and a portion of the follower 132 are received, with a free end 139 of the follower 132 protruding from the holder 136. The holder 136 could instead be integrally formed in the same piece of material as the remainder of the retainer 64, and the retainer may include a cavity for receipt of the follower 132 and spring 134. In at least some positions of the retainer, the follower 132 engages the second body 52, and in at least one position of the retainer 64, the follower 132 does not engage the second body 52 so that the selector 12 may be rotated without the interference of the follower 132 engaging the feedback surfaces 126. In that case, the selector 12 may be more easily rotated with less resistance.

The operation of the shifter 10 will now be described. In FIGS. 4-6, the shifter 10 is shown in a park lock position. In this position, the selector 12 is in a first position that corresponds to the transmission being in park, and the retainer 64 is in a first position in which the retainer prevents rotation of the selector 12. In more detail, in the position shown, the blocking member 84 of the retainer 64 is received in the first void 90 of the second body 52. So arranged, rotation of the selector 12 is prevented by engagement of the second body 52 with the blocking member 84. While the first void 90 is shown as including opposed stop surfaces 89, rotation of the selector 12 in one direction may be blocked by engagement of the selector with a separate stop surface, for example, a stop surface defined by the housing or another component. In the example shown, the stop surface is provided by a bumper 122 (FIGS. 2 and 4) that is mounted to the housing (e.g. the base 18) to provide a less abrupt stop of the selector rotation (in FIGS. 2 and 4, the bumper is shown removed from the base 18). A similar bumper 124 (FIG. 4) and stop surface may be provided at the opposite end of the rotation of the selector 12 and rotation of the selector 12 may be confined to occur between the opposed stop surfaces 122, 124. Accordingly, the selector 12 may only be rotated in one direction out of the park position, and the first void 92 may be arranged to prevent rotation of the selector in that direction without need for a second stop surface 89, if desired.

Figure 7:
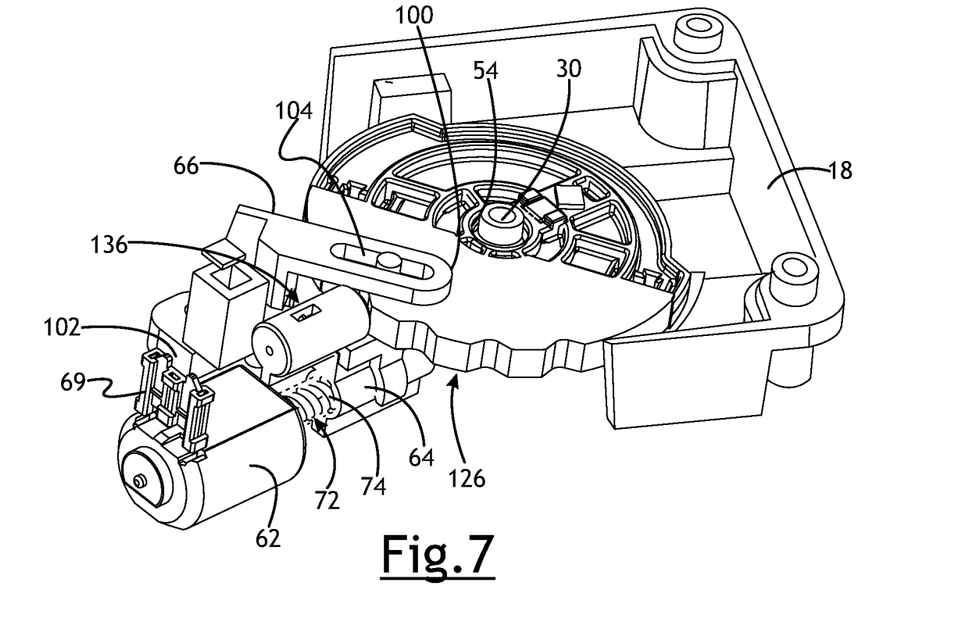
FIG. 7 is a perspective view similar to FIG. 6 but showing the retainer in a second position permitting selector rotation.

To permit rotation of the selector 12 out of the park position, the actuator 62 is commanded to move the retainer 64 away from the first position, to a second position in which the retainer does not prevent rotation of the selector. That is, the blocking member 84 is moved out of and is radially spaced from the first void 90, which can be seen by comparison of FIG. 6 with FIG. 7. In FIG. 7, the retainer is advanced toward the second body 52 which moves the blocking member 84 radially inwardly (relative to the axis 20) and out of the first void 90. Movement of the retainer 64 to the second position may occur in response to the driver taking some prerequisite action, such as actuating a vehicle brake or otherwise. In this position of the retainer, the selector 12 may be rotated out of the park gear without the retainer 64 interfering or blocking rotation of the second body 52.

This movement of the retainer 64 also moves the follower 132 from a first position in which the follower 132 is spaced from the second body 52, as shown in FIG. 6, to a second position in which the end 139 of the follower 132 engages the second body. Accordingly, rotation of the selector 12 away from its park position will encounter variable resistance due to engagement of the follower 132 with the feedback surfaces 126, at least when the retainer 64 is in the second position. When the selector 12 is rotated out of the park position, the follower 132 is rotated out of the first valley 130 and into the second valley 130 or detent that corresponds to a second position of the selector and the reverse gear of the transmission. Further rotation of the selector 12 will move the follower 132 out of the second valley and into the third valley that corresponds to a third position of the selector.

Figure 8:
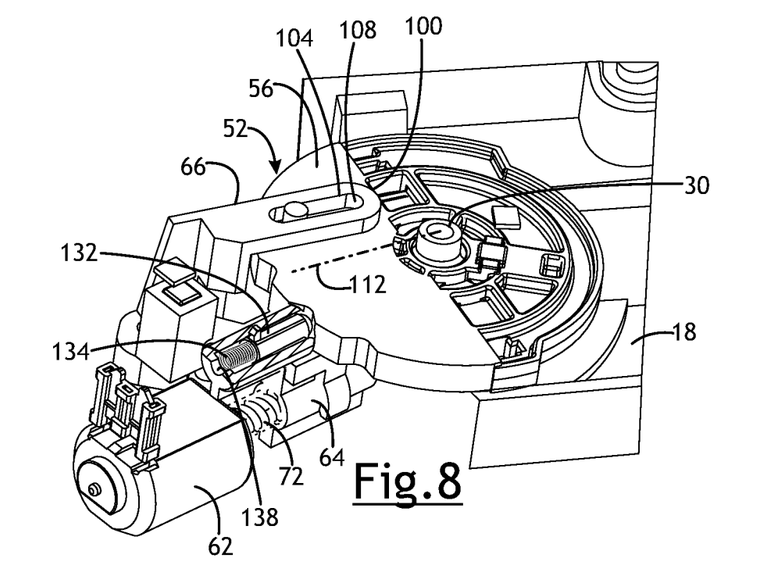
FIG. 8 is a perspective view showing the selector in a third position corresponding to the transmission being in neutral, and the retainer in the second position.
Figure 9:
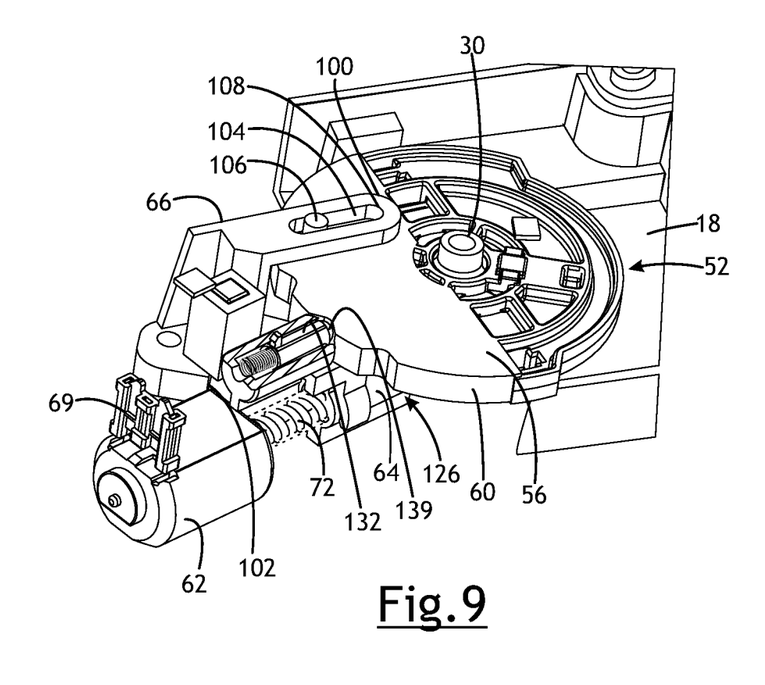
FIG. 9 is a perspective view similar to FIG. 8 but showing the retainer in the third position preventing selector rotation as in FIG. 5B.

FIG. 8 illustrates the selector 12 in the third position, with the follower 132 received in the third valley 130, and the retainer 64 in the second position with the follower 132 engaged with the feedback surfaces 126. In this position of the shifter 10, the vehicle transmission is in neutral and the selector 12 may be rotated from the third position back to the second position or into a fourth position (corresponding to the transmission being in a forward drive gear, and the follower 132 being received in the fourth valley 130). In at least some implementations, if one or more criteria are met, the controller 28 will cause the actuator 62 to move the retainer 64 relative to the second body 52 so that the retainer 64 blocks rotation of the selector 12 out of the third position. In FIGS. 5B and 9, the retainer 64 is shown in a third position, which is further advanced away from the actuator 62 (as can be seen by comparing FIGS. 8 and 9). In this position, the blocking member 84 of the retainer 64 is received within the second void 92 (shown in FIGS. 5A and 5B) and between the stop surfaces 91. Further, this third position of the retainer puts the retainer 64 closest to the axis 20 and farthest from the actuator 62, although other arrangements may be used. In this position of the shifter 10, the selector 12 cannot be rotated to cause a transmission shift without the retainer 64 being moved to unblock rotation of the second body 52. The follower 132 is also moved further toward the second body 52 when the retainer 64 moves from its second position to its third position. This movement is taken up, in the example shown, by the spring 134, which can compress sufficiently to accommodate this movement of the retainer 64.

When the controller 28 actuates the actuator 62, the retainer 64 is moved from the third position to or toward the second position sufficiently such that the blocking member 84 is moved out of the void 92. This may occur, for example, when the driver has actuated the vehicle brake or taken some other prerequisite action. After this retainer movement, the selector 12 can be rotated to the fourth position, as shown in FIGS. 10 and 11, or to the second or first position.

As noted above, rotation of the selector 12 moves the second shift member 66 as can be seen by comparison in the various figures, especially FIG. 6 which shows a first position of the second shift member 66 which is achieved when the selector 12 is in the first position and FIG. 10 which shows a second position of the second shift member 66 when the selector 12 is in the fourth position.

In at least some implementations, when the selector 12 is in a position other than the first position, the selector 12 may be driven to the first position or back toward the first position by the actuator 62 acting on the second shift member 66 through the retainer 64. In this position shown in FIG. 11, the drive surface 96 of the retainer 64 is engaged with a cam surface 140 of the second shift member 66. The cam surface 140 is, at least when the selector 12 is not in the first position, not parallel to the path of movement of the retainer drive surface 96. Driving the retainer 64 back toward the actuator 62 and toward the first position of the retainer 64 causes the drive surface 96 to engage the cam surface 140 and rotate the second shift member 66 about the pivot 98. Rotation of the second shift member 66 drives the second body 52 for rotation by engagement of the second shift member 66 with the post 106.

In at least some implementations, the cam surface 140 is at its greatest angle relative to the path of motion of the drive surface 96 when the selector 12 is in the fourth or drive position, or whatever is the furthest position of the selector from the first or park position. The angle of the cam surface 140 relative to the path of motion of the retainer 64 and its drive surface 96 decreases as the second shift member 66 rotates in the direction that corresponds with the selector rotation back toward the first or park position. At some point during movement of the retainer back toward its first position, the follower 132 will disengage from the second body. Further rotation of the selector 12 can then be accomplished by the second shift member 66 without having to overcome the resistance of follower 132 acting on the second body 52. This facilitates shifting of the selector by the second shift member, and reduces the force required to be provided to the second shift member by the actuator and retainer. This may permit use of a smaller, lighter and less expensive actuator. Any noise associated with rotating the feedback surfaces 126 past the follower 132 (e.g. clicking through the positions) may also be eliminated so that the driver or passengers are not alarmed by such noise during a secondary shift movement of the selector.

In this way, the second body 52 and selector 12 may be rotated from the fourth position, through the third and second positions and to the first position. As the selector 12 reaches the first position, the cam surface 140 may be generally aligned with the path of motion of the drive surface 96 such that further rotation of the second body 52 does not occur. This permits the blocking member 84 to be moved into the first void 90 without rotation of the second body 52 which would move the first void 90 out of alignment with the blocking member 84. In this way, the retainer 64 can be moved back to its first position, and then the shifter 10 is returned to the park position shown in FIGS. 4-6.

Of course, it may also be possible to move the shifter 10 to a different position other than the first position, such as the third position in which the transmission is in neutral. Instead, the shifter 10 could be driven/rotated in the opposite direction, e.g. from a lower numbered position to a higher numbered position by suitably arranged driving and cam surfaces (which may involve driving the retainer away from the actuator toward an extended position). Further, while the above description sets forth one example use wherein the feedback surfaces 126 are not engaged during shifting of the selector by the second shift member, the feedback surfaces 126 could be moved from the second body in other instances, such as to facilitate manual rotation of the selector, as desired. Accordingly, the disclosure is not limited to removal of the resistance caused by engagement of a follower 132 with the feedback surfaces 126 only when the second shift member is actively driven.

Further, while the follower 132 is noted as being carried by the retainer so that a single actuator controls movement of the follower 132 relative to the feedback surfaces 126 and the retainer relative to the selector, the follower 132 need not be carried by the retainer. For example, the follower 132 could be carried by the base and driven by a separate actuator toward and away from the feedback surfaces 126 of the selector. The follower 132 could instead be carried by the selector and driven toward and away from feedback surfaces formed in the housing, provided in a component carried by the housing or defined in another component, as desired. The actuator that drives the follower 132 could be a solenoid with the follower 132 driven by a movable armature of the solenoid, or any other actuator (linear, rotary or other) that can move the follower 132 from a first position wherein the follower 132 is engaged with the feedback surfaces and a second position wherein the follower 132 is not engaged with the feedback surfaces. Still further, it may be possible to drive a follower 132 that is not carried by the retainer with the actuator 62 that drives the retainer 64, with, for example, one or more gears driven by the drive shaft or spindle, or a belt/pulley or chain/sprocket arrangement driven by the drive shaft or spindle. Of course, other arrangements may be used, as desired.

While the forms of the invention herein disclosed constitute presently preferred embodiments, many others are possible. For example, while the follower 132 was described as being carried by the retainer, the feedback surfaces 126 could instead be carried by the retainer and the follower 132 could be carried by the second body, or otherwise by the selector. Either or both of the follower 132 and feedback surfaces 126 could be biased (a component defining the feedback surfaces 126 could be biased relative to the second body or retainer, depending upon the arrangement used) or otherwise movable to accommodate movement of the retainer. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A shifter for a vehicle transmission, comprising:
a first shift member having a body rotatable among multiple positions;
a second shift member coupled to the first shift member and movable between a first position and a second position;
an actuator coupled to the second shift member to drive the second shift member between the first position and second position and thereby rotate the first shift member from one of the multiple positions to another of the multiple positions;
multiple feedback surfaces associated with the first shift member; and
a follower movable relative to the feedback surfaces between a first position and a second position, wherein, when the follower is in the first position, the follower is not engageable with the feedback surfaces, and when the follower is in the second position, the follower is engageable with the feedback surfaces and there is relative sliding motion between the follower and the feedback surfaces when the first shift member is rotated, and
wherein the first shift member rotates about an axis and the feedback surfaces include multiple valleys and multiple peaks, with a respective one of the peaks located between two adjacent valleys, and wherein the peaks are located at a different distance from the axis than are the valleys, and wherein the follower is yieldably biased for movement closer to and further away from the axis so that the follower may remain engaged with the feedback surfaces when aligned with the peaks and when aligned with the valleys.

2. The shifter of claim 1 wherein the follower is driven between the first position and second position by the actuator.

3. The shifter of claim 1 which also includes a retainer movable relative to the body, the retainer being coupled to the actuator and driven by the actuator between a first position in which the retainer prevents movement of the body and a second position in which the retainer permits movement of the body.

4. The shifter of claim 3 wherein the follower is carried by the retainer for movement with the retainer, and when the retainer is in the second position the follower is in the second position.

5. The shifter of claim 4 wherein the retainer moves along a linear path between the first position of the retainer and the second position of the retainer.

6. The shifter of claim 3 wherein the retainer and body include control features that are radially overlapped relative to the axis when the retainer is in the first position and are not radially overlapped when the retainer is in the second position.

7. A shifter for a vehicle transmission, comprising:
a first shift member having a body rotatable among multiple positions;
a second shift member coupled to the first shift member and movable between a first position and a second position;
an actuator coupled to the second shift member to drive the second shift member between the first position and second position and thereby rotate the first shift member from one of the multiple positions to another of the multiple positions;
multiple feedback surfaces associated with the first shift member; and
a follower movable relative to the feedback surfaces between a first position and a second position, wherein, when the follower is in the first position, the follower is not engageable with the feedback surfaces, and when the follower is in the second position, the follower is engageable with the feedback surfaces and there is relative sliding motion between the follower and the feedback surfaces when the first shift member is rotated,
wherein the feedback surfaces are provided on the body and wherein the peaks are radially farther from the axis than are the valleys.

8. The shifter of claim 7 wherein each valley corresponds to a respective one of the multiple positions of the first shift member.

9. A shifter for a vehicle transmission, comprising:
a first shift member having a body rotatable among multiple positions;
a second shift member coupled to the first shift member and movable between a first position and a second position;
an actuator coupled to the second shift member to drive the second shift member between the first position and second position and thereby rotate the first shift member from one of the multiple positions to another of the multiple positions;
multiple feedback surfaces associated with the first shift member; and
a follower movable relative to the feedback surfaces between a first position and a second position, wherein, when the follower is in the first position, the follower is not engageable with the feedback surfaces, and when the follower is in the second position, the follower is engageable with the feedback surfaces and there is relative sliding motion between the follower and the feedback surfaces when the first shift member is rotated;
a retainer movable relative to the body, the retainer being coupled to the actuator and driven by the actuator between a first position in which the retainer prevents movement of the body and a second position in which the retainer permits movement of the body, and
wherein the second shift member has a first end, a second end and is coupled to a pivot between the first end and second end for rotation of the second shift member about the pivot, and wherein the second shift member is coupled to the body between the pivot and first end and the retainer is engageable with the second shift member between the pivot and second end, and wherein rotation of the body causes the second shift member to rotate about the pivot and engagement of the retainer with the second shift member during at least a portion of the movement of the retainer from the second position of the retainer toward the first position of the retainer causes the second shift member to rotate about the pivot and rotate the body.

10. The shifter of claim 9 wherein the distance from the pivot to the first end is greater than the distance from the pivot to the second end.

11. The shifter of claim 9 wherein the retainer includes a cam surface at least a portion of which is located between the pivot and the second end, wherein the cam surface is inclined relative to the path of movement of the retainer so that engagement of the retainer with the cam surface of the second shift member causes increased rotation of the body.

* * * * *